US012496479B2

(12) United States Patent
Silva, Jr. et al.

(10) Patent No.: US 12,496,479 B2
(45) Date of Patent: Dec. 16, 2025

(54) FIRE PROTECTION SPRINKLER ASSEMBLY

(71) Applicant: Tyco Fire Products LP, Lansdale, PA (US)

(72) Inventors: Manuel R. Silva, Jr., Cranston, RI (US); Samuel George Warren Kent, Providence, RI (US)

(73) Assignee: Tyco Fire Products LP, Cranston, RI (US)

( * ) Notice: Subject to any disclaimer, the term of this patent is extended or adjusted under 35 U.S.C. 154(b) by 582 days.

(21) Appl. No.: 17/708,782

(22) Filed: Mar. 30, 2022

(65) Prior Publication Data

US 2022/0323806 A1 Oct. 13, 2022

Related U.S. Application Data

(60) Provisional application No. 63/171,731, filed on Apr. 7, 2021.

(51) Int. Cl.

*A62C 35/68* (2006.01)
*A62C 3/02* (2006.01)
*A62C 35/62* (2006.01)

(52) U.S. Cl.

CPC ............ *A62C 35/68* (2013.01); *A62C 3/0214* (2013.01); *A62C 35/62* (2013.01)

(58) Field of Classification Search

CPC .......... A62C 35/62; A62C 35/68; A62C 3/004
USPC ...................................................... 169/17, 37
See application file for complete search history.

(56) References Cited

U.S. PATENT DOCUMENTS 5,083,618 A * 1/1992 Hayes .................. A62C 3/0214 169/70
2006/0113094 A1* 6/2006 Silva, Jr. ................ A62C 35/62 169/17
2008/0257564 A1* 10/2008 Cordell .................. A62C 35/62 169/17
2009/0139735 A1* 6/2009 Orr ........................ A62C 35/68 169/51
2013/0037281 A1* 2/2013 Szentimrey ............ A62C 35/62 169/54
2013/0043328 A1* 2/2013 Williams ............... A62C 37/08 239/288
2023/0001248 A1* 1/2023 Cogswell ............... A62C 35/68

* cited by examiner

*Primary Examiner* — Cody J Lieuwen
(74) *Attorney, Agent, or Firm* — Foley & Lardner LLP

(57) ABSTRACT

At least one aspect is directed to a fire protection sprinkler system to provide fire protection for an outdoor area. The fire protection system can include a dry pendent sprinkler assembly. The dry pendent sprinkler assembly can include a body portion, a sprinkler head portion, or a deflector portion. The body portion can secure the dry pendent sprinkler assembly with a feed line. The feed line can be disposed on an opposite side of an exterior wall relative to the sprinkler head portion. The feed line can include a fire protection fluid. The body portion can protrude from the exterior wall at an angle of at least 55 degrees relative to a lateral exterior projection that protrudes into the outdoor area from the exterior wall. The dry pendent sprinkler assembly can expel the fire protection fluid to cover the outdoor area.

17 Claims, 10 Drawing Sheets

Fig. 10
1000
1005
Provide fire exposure protection sprinkler system

FIRE PROTECTION SPRINKLER ASSEMBLY

CROSS-REFERENCE TO RELATED APPLICATIONS

The present application claims the benefit of and priority to U.S. Provisional Application No. 63/171,731, filed Apr. 7, 2021, the disclosure of which is incorporated herein by reference in its entirety.

BACKGROUND

Buildings and other areas can include sprinklers to provide fire protection. In the event of a fire, the sprinklers can dispense a fluid to control, suppress or extinguish the fire that occurs beneath an exterior projection.

SUMMARY

At least one aspect is directed to a fire protection sprinkler system to provide fire protection for an outdoor area. The fire protection system can include a dry pendent sprinkler assembly. The dry pendent sprinkler assembly can include a body portion, a sprinkler head portion, or a deflector portion. The body portion can secure the dry pendent sprinkler assembly with a feed line. The feed line can be disposed on an opposite side of an exterior wall relative to the sprinkler head portion. The feed line can include a fire protection fluid. The body portion can protrude from the exterior wall at an angle of at least 55 degrees relative to a lateral exterior projection that protrudes into the outdoor area from the exterior wall. The dry pendent sprinkler assembly can expel the fire protection fluid to cover the outdoor area. The outdoor area can have a width of at least 10 feet.

At least one aspect is directed to a method of providing fire protection for an outdoor area. The method can include providing a dry pendent sprinkler assembly. The dry pendent sprinkler assembly can include a body portion, a sprinkler head portion, and a deflector portion. The method can include securing the dry pendent sprinkler assembly with a feed line. The feed line can be disposed on an opposite side of an exterior wall relative to the sprinkler head portion. The feed line can include a fire protection fluid. The method can also include disposing the body portion to protrude from the exterior wall. The body portion can protrude from the exterior wall at an angle of at least 55 degrees relative to a lateral exterior projection that protrudes into the outdoor area from the exterior wall. The dry pendent sprinkler assembly can expel the fire protection fluid to cover the outdoor area. The outdoor area can have a width of at least 10 feet.

At least one aspect is directed to a method of providing fire protection for an outdoor area. The method can include providing a dry pendent sprinkler assembly. The dry pendent sprinkler assembly can include a body portion, a sprinkler head portion, and a deflector portion. The body portion can secure the dry pendent sprinkler assembly with a feed line. The feed line can be disposed on an opposite side of an exterior wall relative to the sprinkler head portion. The feed line can include a fire protection fluid. The body portion can protrude from the exterior wall at an angle of at least 55 degrees relative to a lateral exterior projection that protrudes into the outdoor area from the exterior wall. The dry pendent sprinkler assembly can expel the fire protection fluid to cover the outdoor area. The outdoor area can have a width of at least 10 feet.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of a fire protection sprinkler assembly. The various concepts introduced above and discussed in greater detail below may be implemented in any of numerous ways.

The present disclosure generally refers to a fire sprinkler. The present disclosure refers to a dry pendent fire sprinkler to disperse water from a sprinkler over a desired area.

At least one aspect of the present disclosure is a fire protection sprinkler system to provide fire protection for an outdoor area. Outdoor areas can be subjected to freezing temperatures and therefore a dry sprinkler is used to prevent the system and sprinkler from freezing. The fire protection sprinkler system includes a fluid supply line to provide fire protection fluid to the fire protection sprinkler system, and a fire protection sprinkler that protrudes from an exterior wall and provide fire protection to the outdoor area. The sprinkler system generally includes a body portion, a sprinkler head portion, and a deflector portion. The fluid supply line is supplied to the sprinkler system through the body portion disposed on an opposite side of the exterior wall relative to the outdoor area. The opposing side of the exterior wall is generally temperature-controlled to prevent freezing of the fire protection fluid. The outdoor area is generally defined by an area underneath a lateral projection that extends from the exterior wall. The fire protection sprinkler protrudes from the wall at an angle of at least 55 degrees from the horizontal plane of the lateral projection protruding from the wall. The sprinkler system can cover an area (e.g., width) of at least 10 feet from the exterior wall. For example, the coverage area can extend from the exterior wall (at 0 feet) to at least 10 feet laterally outward from the exterior wall. For example, the sprinkler system can provide protection for an area extending from the exterior wall up to at least 10 feet away from the wall. The sprinkler system can protect an area extending from the exterior wall up to 7 feet from the exterior wall. The sprinkler system can protect an area extending from the exterior wall up to 2 feet from the exterior wall.

Referring generally to the figures, fire protection systems include sprinklers which can inhibit or permit flow of fluid (typically water, but also in some applications fire suppressant fluid) depending upon conditions. In the instance of a fire or detected conditions that may be indicative of a fire (e.g., increased heat, smoke, or another indication), the sprinklers can permit the flow of fluid such that the fluid may contact a deflector and be dispersed so as to provide protection to an outdoor area.

Figure 1:
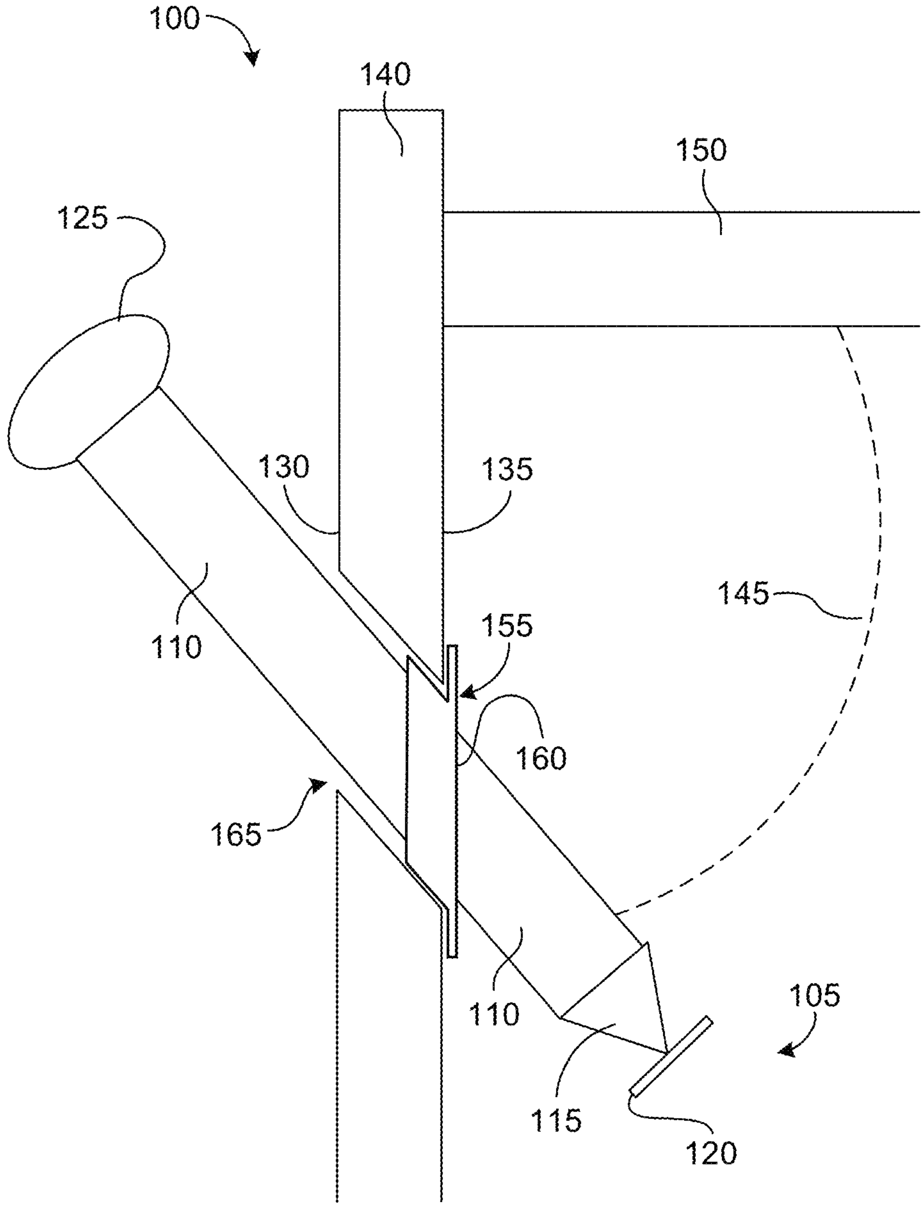
FIG. 1 is an example side view of a portion of a fire protection sprinkler assembly, according to an example implementation.

FIG. 1 depicts a fire protection system 100. For example, the sprinkler system can provide fire protection for an outdoor area. The outdoor area can be an area underneath a projection from a building (e.g., canopy, awning, pavilion, or another projection). The system 100 can include at least one dry pendent sprinkler assembly 105. The dry pendent sprinkler assembly 105 can include at least one body portion 110. For example, the body portion 110 can be a singular component of various shapes (e.g., cylindrical, spherical, rectangular, or another shape). The body portion 110 can include several components of various shapes.

The dry pendent sprinkler assembly 105 can include at least one sprinkler head portion 115. For example, the sprinkler head portion 115 can be various shapes (e.g., convex, concave, circular, semi-circular, triangular, rectangular, or another shape). The dry pendent sprinkler assembly 105 can include at least one deflector portion 120. For example, the deflector portion 120 can be various shapes (e.g., rectangular, circular, triangular, or another shape). The deflector portion 120 can be made of various materials (e.g., metal, plastic, or another material).

The body portion 110 can secure the dry pendent sprinkler assembly 105 with at least one feed line 125. For example, the feed line 125 can be disposed on an opposite side 130 of an exterior wall 140 relative to the sprinkler head portion 115. For example, the sprinkler head portion 115 can protrude from an exterior side 135 of the exterior wall 140. The feed line 125 can include fire protection fluid. For example, the fire protection fluid can be a fire suppressing agent, water, gas, or any combination thereof. The body portion 110 can be made to take fluid from the feed line 125 and disperse the fluid to various portions of the dry pendent sprinkler assembly 105. For example, the deflector portion 120 can be made to take fire protection fluid from the body portion 110 or the head portion 115 of the dry pendent sprinkler assembly 105 and disperse the fluid in various directions (e.g., cylindrically, side-to-side, conically, or another direction.).

The body portion 110 can protrude from the exterior wall 140. For example, the body portion 110 can protrude from the exterior wall 140 at an angle 145. For example, the body portion 110 can protrude from the exterior wall 140 at an angle 145 greater than 45 degrees relative to an exterior projection 150 that protrudes from the exterior wall 140. For example, the body portion 110 can protrude from the exterior wall 140 at an angle 145 of 55 degrees, of 60 degrees, of 65 degrees, or at another angle. The exterior projection 150 can extend laterally from the exterior wall 140 (e.g., awning, canopy, or another projection.).

Figure 2:
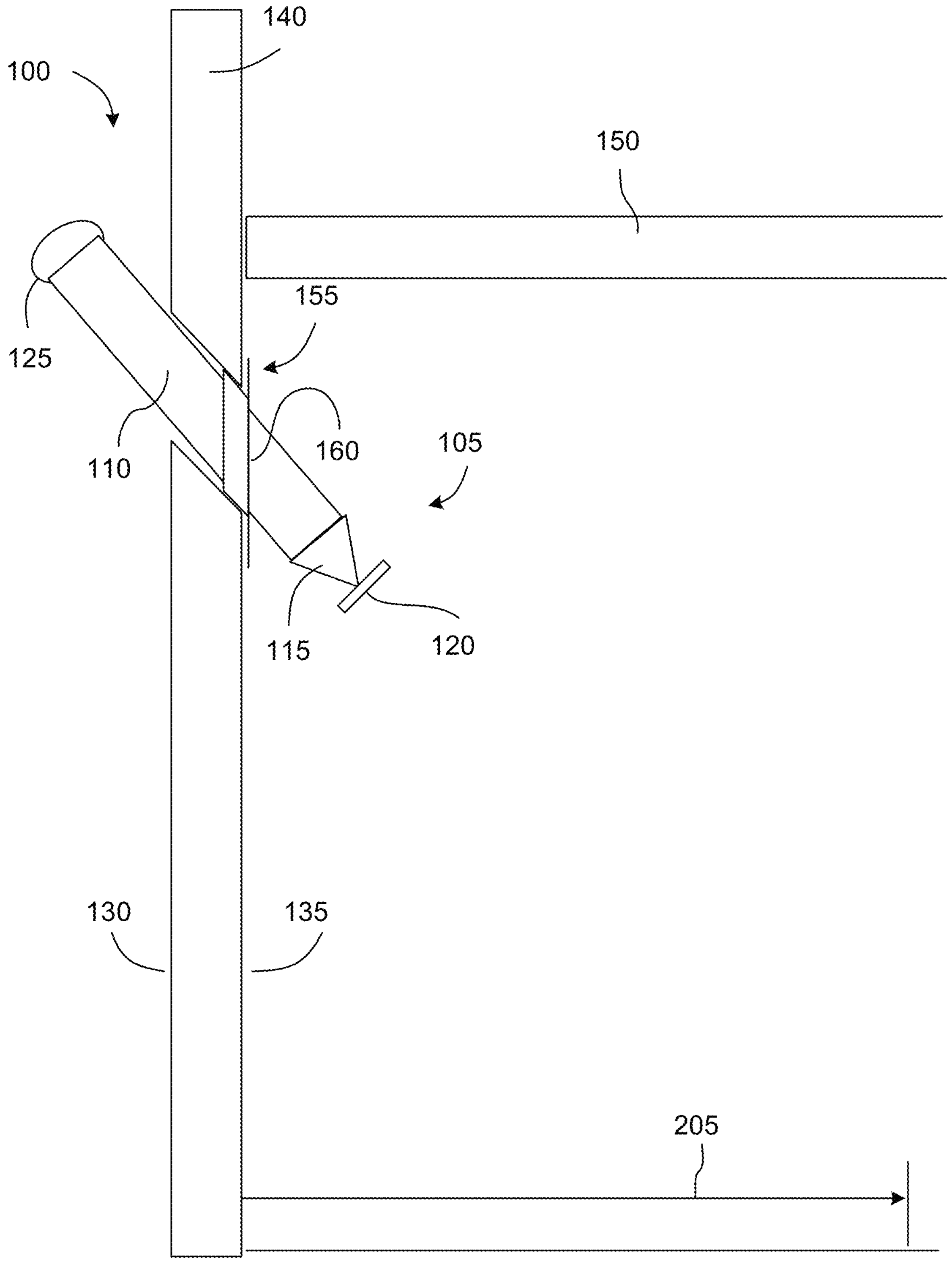
FIG. 2 is another example side view of the portion of the fire protection sprinkler assembly of FIG. 1, according to an example implementation.

Referring to FIGS. 1 and 2, and among others, the dry pendent sprinkler assembly 105 can expel fire protection fluid. For example, the dry pendent sprinkler assembly 105 can expel fire protection fluid to cover the outdoor area. The outdoor area can have a width 205 greater than 7 feet 6 inches. For example, the dry pendent sprinkler assembly 105 can have a length of throw of 10 feet from the exterior side 135 of the exterior wall 140. The dry pendent sprinkler assembly 105 can have a length of throw of 11 feet, of 12 feet, of 13 feet, or more.

Figure 3:
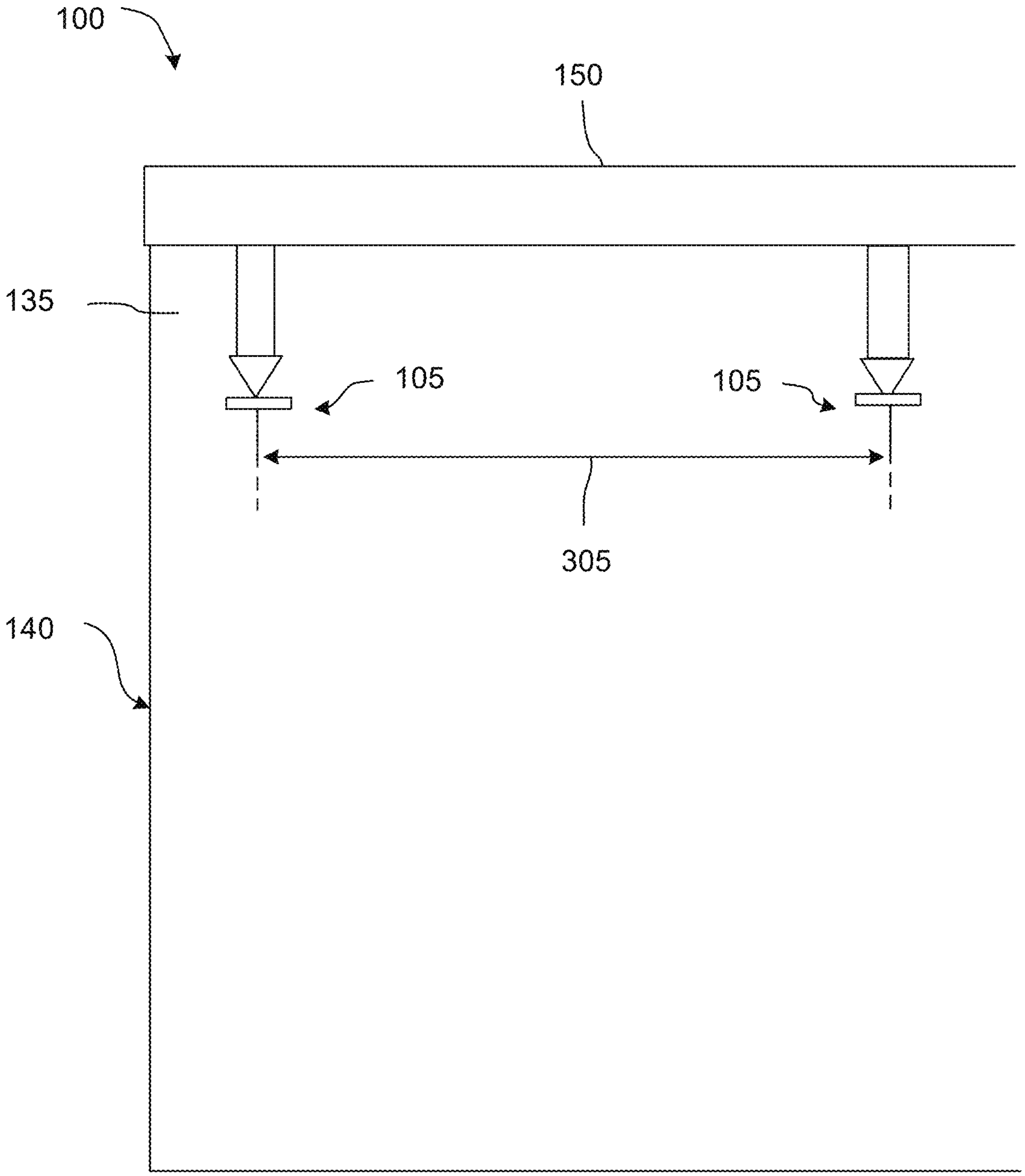
FIG. 3 is an example front view of the fire protection sprinkler assembly of FIG. 1, according to an example implementation.

Referring to FIG. 3, the system 100 can include a plurality of dry pendent sprinkler assemblies 105. For example, the dry pendent sprinkler assemblies 105 can be positioned along the exterior wall 140 a horizontal distance 305 from one another. The dry pendent sprinkler assemblies 105 can be positioned along the exterior wall 140 at a distance 305 equal to or greater than 6 feet from one another. For example, the dry pendent sprinkler assemblies 105 can be positioned 7 feet apart, 8 feet apart, 9 feet apart, 10 feet apart, or more. For example, the dry pendent sprinkler assemblies 105 can be positioned up to 14 feet apart.

Referring to FIGS. 1-3, and among others, the dry pendent sprinkler assembly 105 can cover at least one of the requirements in accordance with NFPA 13 section 10.3 (2019 edition). For example, the dry pendent sprinkler assembly 105 can cover at least one of the requirements in accordance with NFPA 13 section 10.3 (2019 edition) table 10.3.3.2.1 when positioned at an angle 145 of at least 55 degrees relative to the exterior projection 150. For example, the dry pendent sprinkler assembly 105 can accommodate at least one of the requirements of section 10.3, such as protecting a maximum room width 205 of 10 feet under an ordinary hazard, noncombustible or limited-combustible ceiling flash, as defined in table 10.3.3.2.1. For example, the dry pendent sprinkler assembly 105 can protect a maximum room width 205 of 14 feet under a light hazard, noncombustible or limited-combustible ceiling flash, as defined in table 10.3.3.2.1. For example, the dry pendent sprinkler assembly 105 can be placed a maximum distance 305 of 14 feet from another dry pendent sprinkler assembly 105 under a light hazard, noncombustible or limited-combustible ceiling finish, as defined in table 10.3.3.2.1. The dry pendent sprinkler assembly 105 can accommodate another requirement of table 10.3.3.2.1 or any combination thereof.

The dry pendent sprinkler assembly 105 can cover at least one of the requirements in accordance with NFPA 13 section 10 (2019 edition). For example, the dry pendent sprinkler assembly 105 can cover at least one of the requirements in accordance with NFPA 13 section 10 (2019 edition) when positioned at an angle 145 of at least 55 degrees relative to the exterior projection 150. For example, the deflector portion 120 of the dry pendent sprinkler assembly 105 can be positioned 6 inches below the lateral exterior projection 150. The deflector portion 120 can be positioned 12 inches below the lateral exterior projection 150. The deflector portion 120 can be positioned 1 inch from the exterior wall 140. The deflector portion 120 can be positioned 5 inches from the exterior wall 140. The dry pendent sprinkler assembly 105 can accommodate another requirement of section 10 or any combination thereof.

The dry pendent sprinkler assembly 105 can be devoid of liquid. For example, the body portion 110 is devoid of liquid when the system 100 is not in operation. For example, when fire protection is not necessary, the body portion 110 is devoid of fire protection fluid.

The body portion 110 can be positioned through the exterior wall 140. For example, the body portion 110 can extend through the exterior wall 140 from an opening on the opposite side 130 of the wall 140 relative to the sprinkler head portion 115 to the side 135 of the wall 140 relative to the sprinkler head portion 115. For example, the body portion 110 can be fed through an aperture 165 in the wall 140 (e.g., hole, slot, or another opening).

Referring to FIGS. 1-7, and among others, the system 100 can include a sealing assembly 155. The sealing assembly 155 can couple the dry pendent sprinkler assembly 105 with the exterior wall 140. For example, the sealing assembly 155 can couple the dry pendent sprinkler assembly 105 with the exterior wall 140 in various ways (e.g., welding, fasteners, molding, or another way). The sealing assembly 155 can couple the dry pendent sprinkler assembly 105 to the exterior wall 140 such that no air, gas, or other fluid is permitted to move from the outdoor area to the opposite side 130 of the exterior wall 140, or vice versa, through the aperture 165. For example, the sealing assembly 155 can completely seal off the aperture 165 in the exterior wall 140 when coupling the dry pendent sprinkler assembly 105.

The sealing assembly 155 can be an escutcheon 160. For example, the sealing assembly 155 can cover any gap between the dry pendent sprinkler assembly 105 and the exterior wall 140 when the dry pendent sprinkler assembly 105 is coupled with the wall 140. The escutcheon 160 can be various shapes (e.g., circular, rectangular, triangular, or another shape). The escutcheon 160 can be flanged. For example, the escutcheon 160 can define a flange 405 that protrudes laterally along the side 135 of the exterior wall 140 relative to the sprinkler head portion 115. The flange 405 can extend radially around the escutcheon 160.

Figure 4:
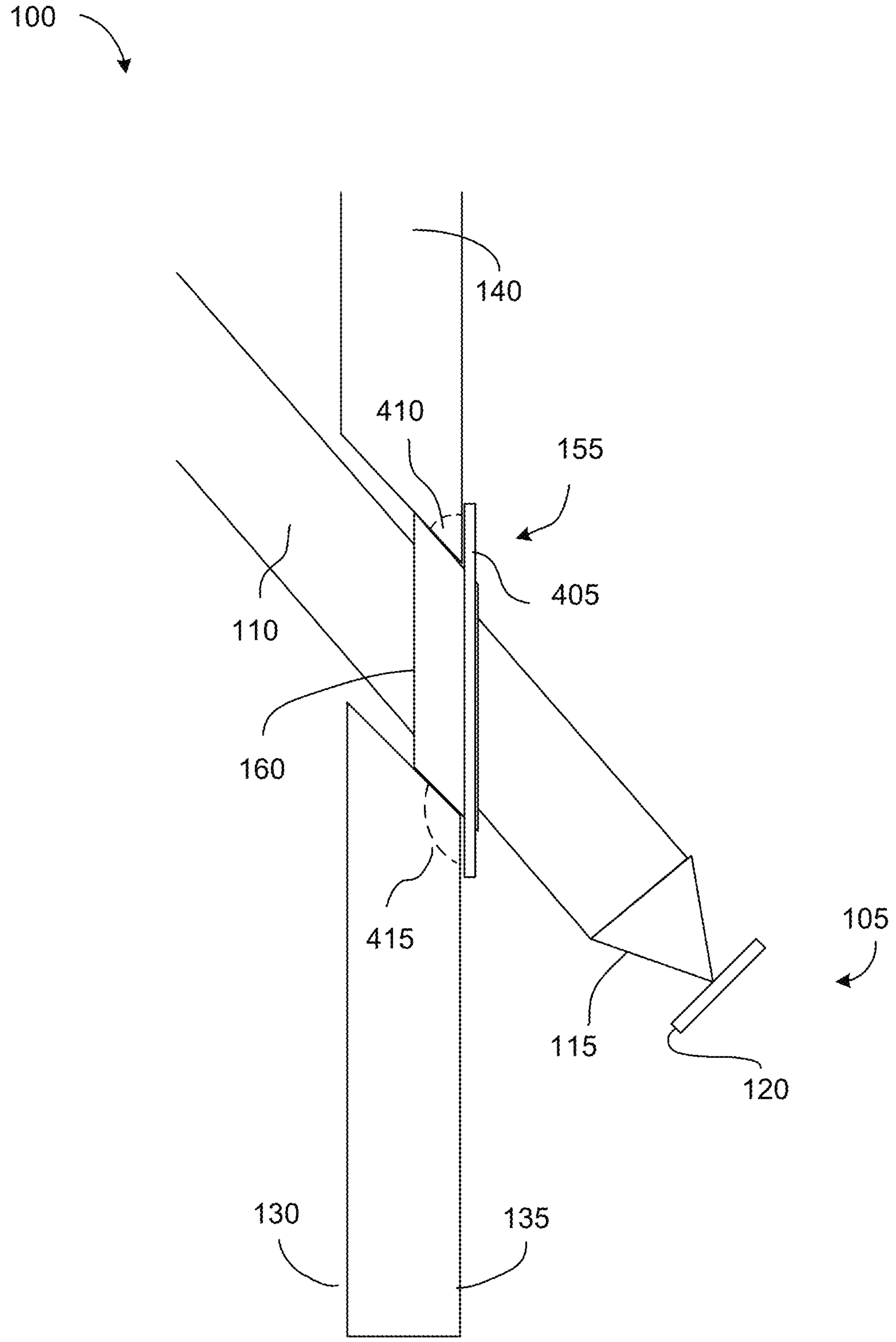
FIG. 4 is an example side view of a sealing assembly of the fire protection sprinkler assembly of FIG. 1, according to an example implementation.

FIG. 4 depicts an example where the escutcheon 160 can include a minimum angle and a maximum angle. The minimum angle can be defined by a smallest angle 410 of the body portion 110 within the exterior wall 140 relative to an opposite side of the flange 405 relative to the sprinkler head portion 115. The maximum angle can be defined by a largest angle 415 of the body portion 110 within the exterior wall 140 relative to the opposite side of the flange 405 relative to the sprinkler head portion 115. The smallest angle 410 can be less than or equal to 35 degrees. For example, the smallest angle 410 can be 35 degrees, 30 degrees, 25 degrees, or smaller. The largest angle 415 can be greater than or equal to 145 degrees. For example. The largest angle 415 can be 145 degrees, 150 degrees, 155 degrees, or greater. The maximum and minimum angles can be significantly greater or significantly smaller. For example, the smallest angle 410 can be 0 degrees. The largest angle 415 can be 180 degrees.

Figure 5:
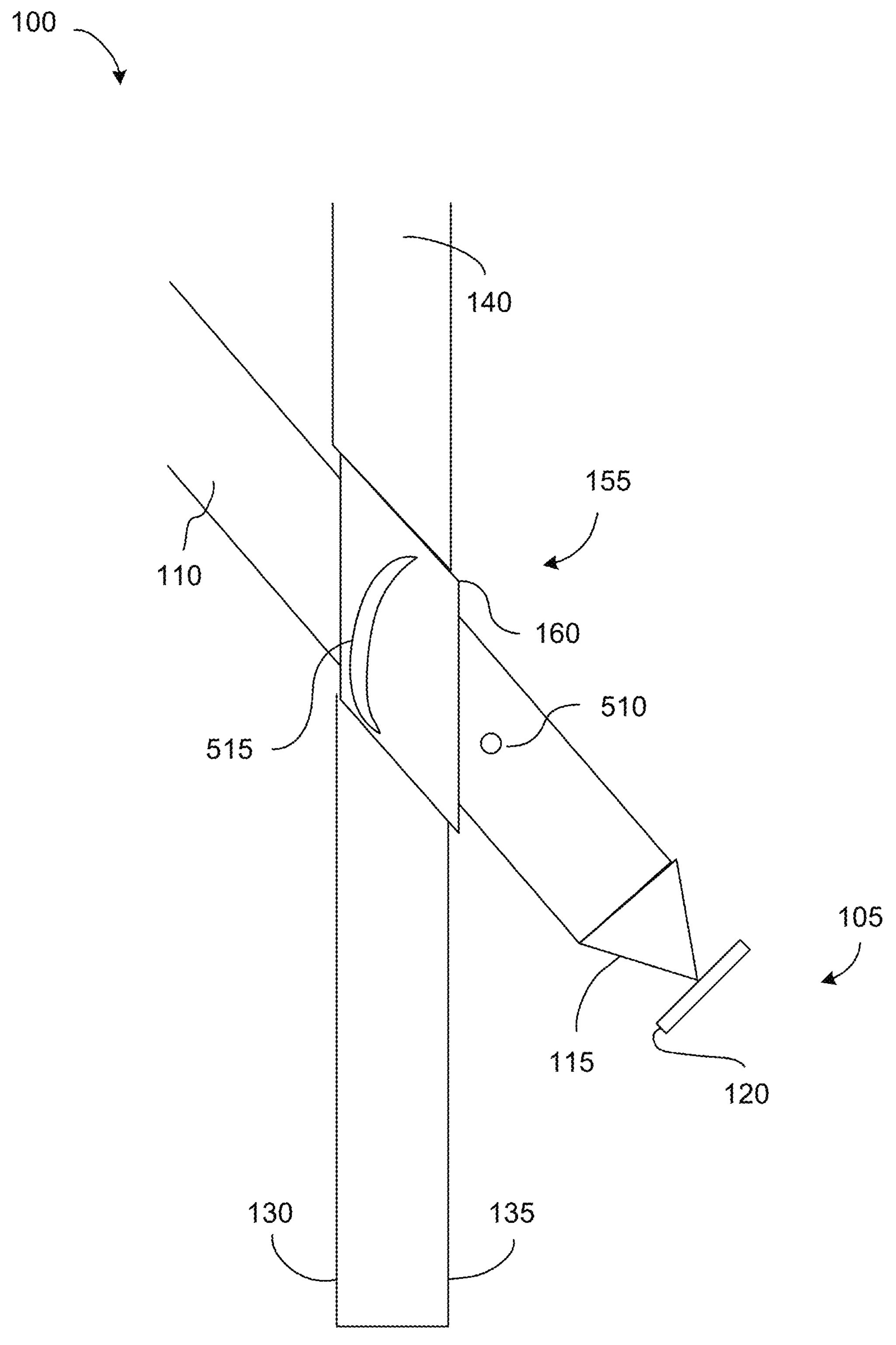
FIG. 5 is an example side view of a sealing assembly of the fire protection sprinkler assembly of FIG. 1, according to an example implementation.

The sealing assembly 155 can be made up of one components or several components. For example, the sealing assembly 155 can include twist-locking components as depicted in FIG. 5. For example, the escutcheon 160 can include a retention slot 515 to receive a projection 510 coupled with the body portion 110. The body portion 110 can be positioned so that the projection 510 engages with retention slot 515 so as to secure the body portion 110 to the exterior wall 140.

Figure 6:
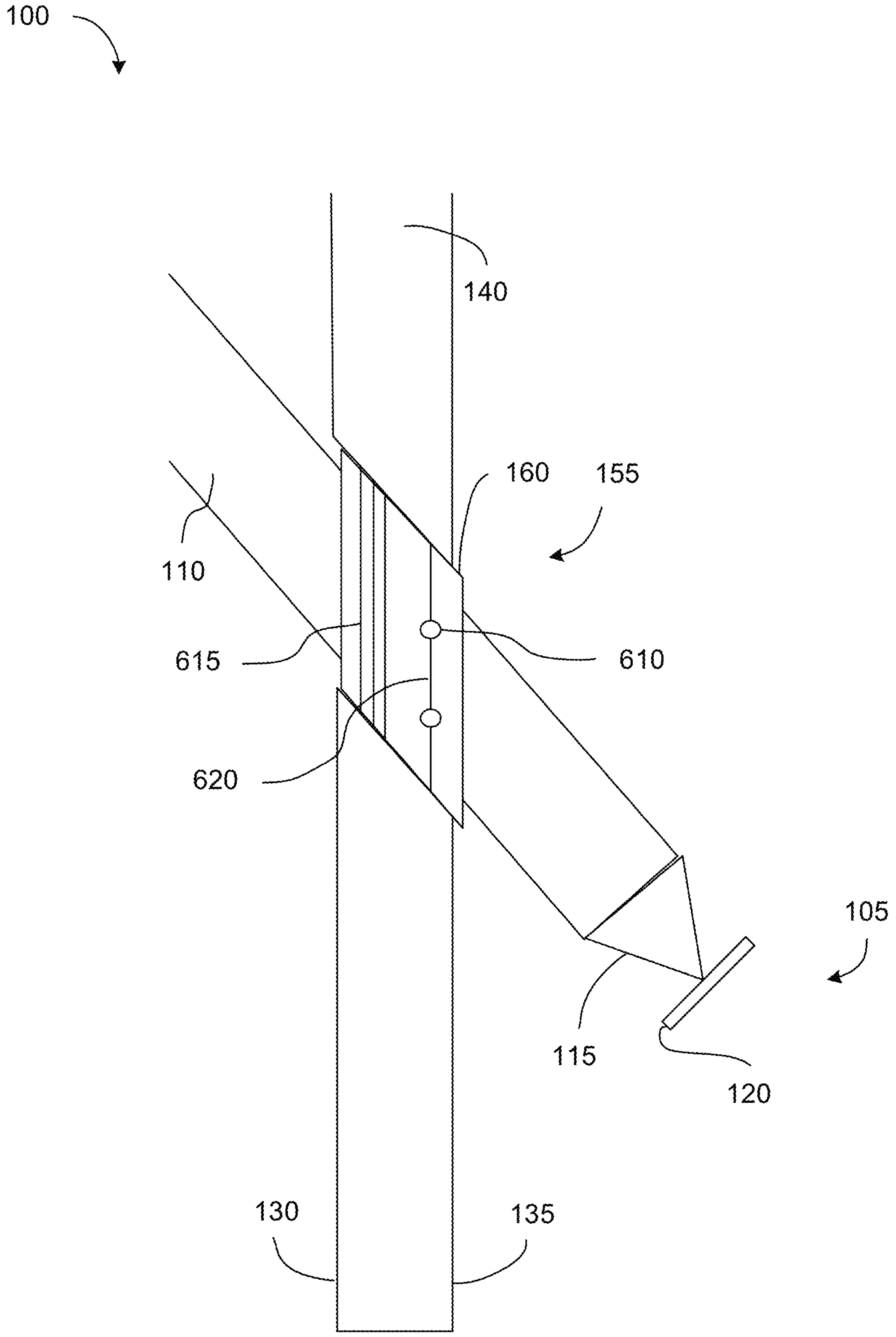
FIG. 6 is an example side view of a sealing assembly of the fire protection sprinkler assembly of FIG. 1, according to an example implementation.

The sealing assembly 155 can include threaded supports as depicted in FIG. 6. For example, the escutcheon 160 can include a threaded support fixture 615 and retaining protrusions 610. The threaded support fixture 615 can be coupled with the exterior wall 140. A retaining seal 620 can be coupled with the threaded support fixture 615. For example, the retaining seal 620 can be coupled with the threaded support fixture 615 through retaining protrusions 610 to completely seal the dry pendent sprinkler assembly 105 to the exterior wall 140. For example, the retaining protrusions 610 can be threaded into the support fixture 615. The body portion 110 can be coupled with the threaded support fixture 615 so as to secure the body portion 110 to the exterior wall 140.

Figure 7:
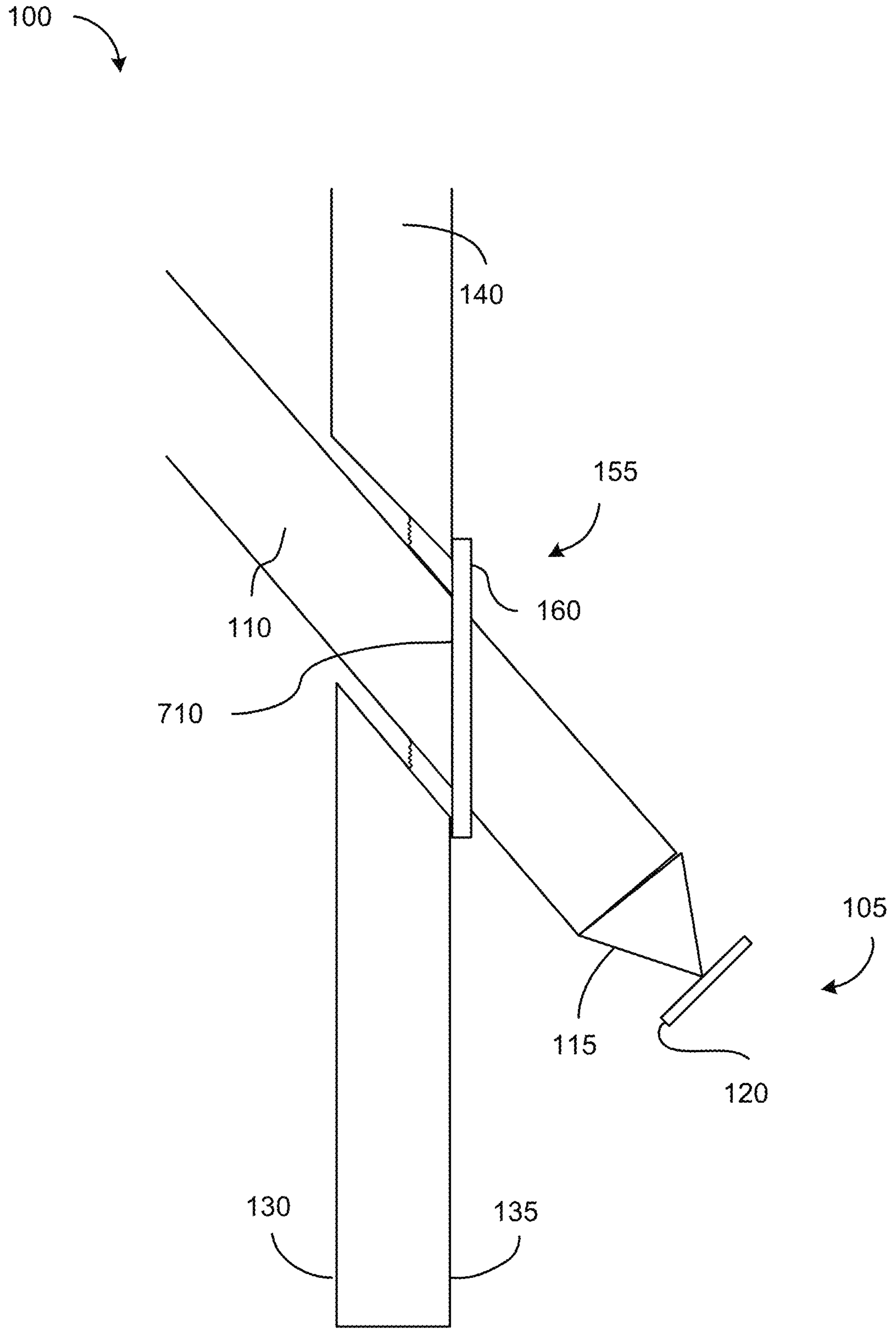
FIG. 7 is an example side view of a sealing assembly of the fire protection sprinkler assembly of FIG. 1, according to an example implementation.

The sealing assembly 155 can include a membrane feature as depicted in FIG. 7. For example, the escutcheon 160 can be shaped similar to a grommet so that the body portion 110 can puncture the escutcheon 160 and cover the body portion 110. For example, the escutcheon 160 can include an aperture to receive the body portion 110. The escutcheon 160 can include an elastomeric component 710 to cover the aperture. For example, the elastomeric component 710 can be punctured by the body portion 110 to enclose the body portion 110 with the escutcheon 160 and seal the dry pendent sprinkler assembly 105 to the exterior wall 140. The escutcheon 160 can be one or more components of various materials (e.g., metal, plastic, rubber, or another material.). The escutcheon 160 can be various shapes (e.g., circular, rectangular, triangular, or another shape.). The escutcheon 160 can be various sizes (e.g., thin, thick, or another size).

Figure 8:
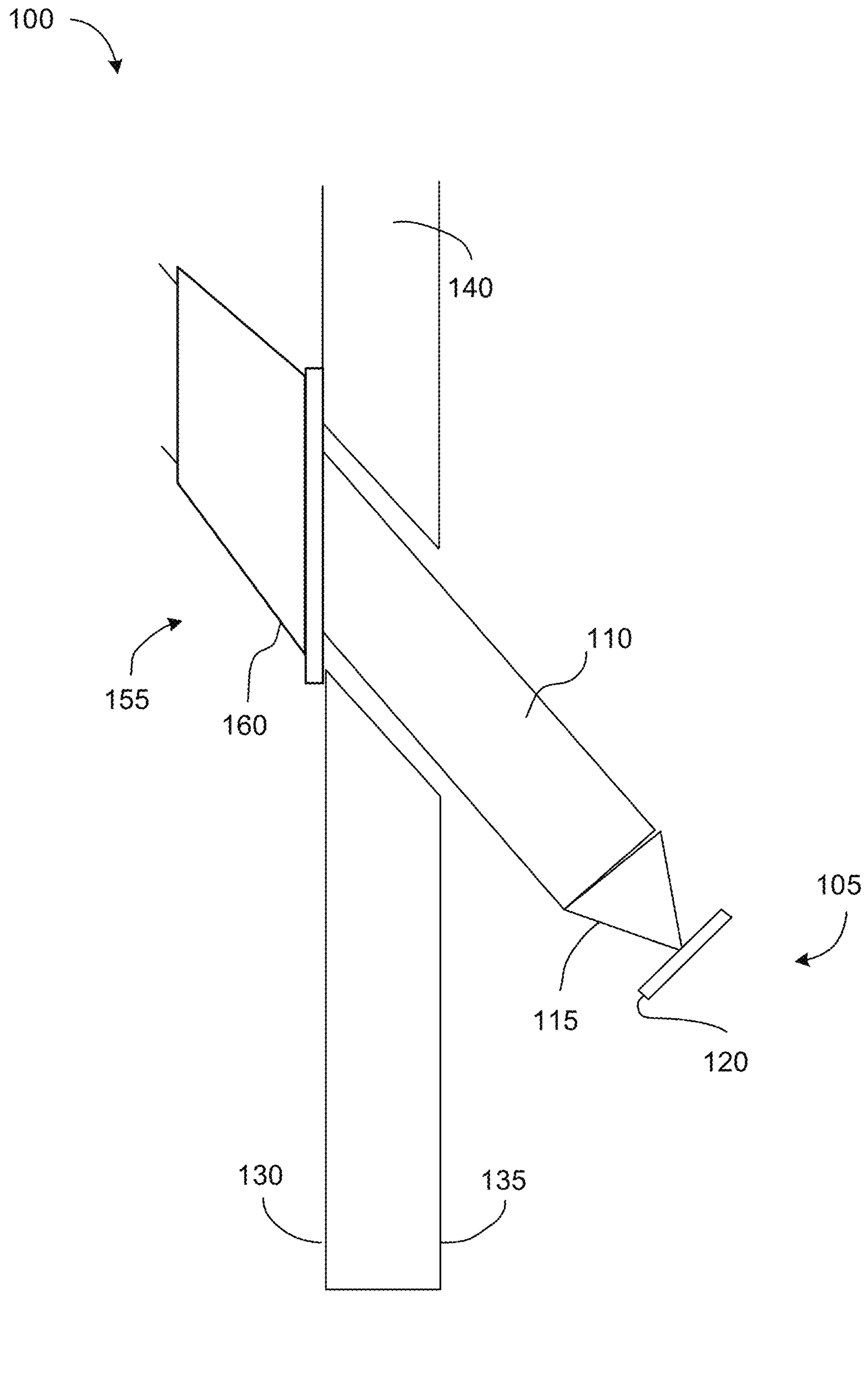
FIG. 8 is an example side view of a sealing assembly of the fire protection sprinkler assembly of FIG. 1, according to an example implementation.

The sealing assembly 155 can couple the sprinkler assembly 105 with the exterior wall 140 on either side of the exterior wall 140. For example, the sealing assembly 155 can be positioned on the opposite side 130 of the exterior wall 140, as depicted in FIG. 8. For example, the escutcheon 160 can secure the body portion 110 protruding from the opposite side 130 of the exterior wall 140 to the exterior wall 140. The sealing assembly 155 can seal the sprinkler assembly 105 to the opposite side 130 of the exterior wall 140 in various ways (e.g., fasteners, adhesives, or another way). The escutcheon 160 can be one or more components of various materials (e.g., metal, plastic, rubber, or another material). The escutcheon 160 can be various shapes (e.g., circular, rectangular, triangular, or another shape.). The escutcheon 160 can be various sizes (e.g., thin, thick, or another size).

The sealing assembly 155 can be formed of various materials (e.g., metal, plastic, rubber, or another material). The sealing assembly 155 can be coupled with the exterior wall 140 in various ways. For example, the sealing assembly 155 can be coupled with the exterior wall 140 so that the dry pendent sprinkler assembly 105 is rigidly attached to the exterior wall 140. The sealing assembly 155 can be coupled with the exterior wall 140 so that the dry pendent sprinkler assembly 105 is adjustably attached to the exterior wall 140.

Figure 9:
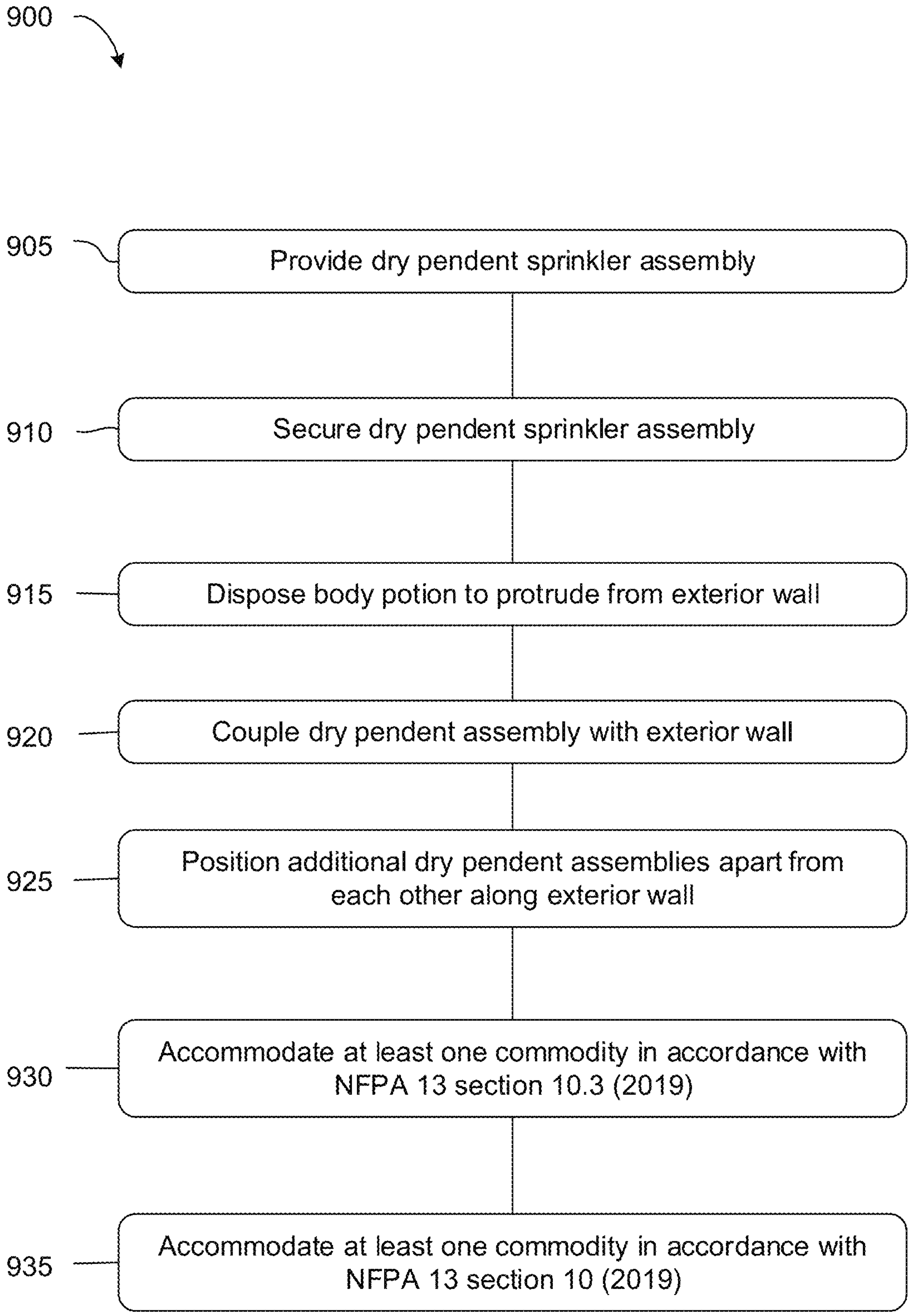
FIG. 9 is an example illustration of a process of providing a fire protection sprinkler system, according to an example implementation.

FIG. 9 depicts a method 900 for providing fire protection. The method 900 can include providing at least one dry pendent sprinkler assembly 105, as depicted in act 905. The dry pendent sprinkler assembly 105 can include at least one body portion 110. For example, the body portion 110 can be a singular component of various shapes (e.g., cylindrical, spherical, rectangular, or another shape). The body portion 110 can include several components of various shapes. The dry pendent sprinkler assembly 105 can include at least one sprinkler head portion 115. For example, the sprinkler head portion 115 can be various shapes (e.g., convex, concave, circular, semi-circular, triangular, rectangular, or another shape). The dry pendent sprinkler assembly 105 can include at least one deflector portion 120. For example, the deflector portion 120 can be various shapes (e.g., rectangular, circular, triangular, or another shape). The deflector portion 120 can be made of various materials (e.g., metal, plastic, or another material).

The method 900 can include securing at least one dry pendent sprinkler assembly 105, as depicted in act 910. For example, the body portion 110 can secure the dry pendent sprinkler assembly 105 with at least one feed line 125. The feed line 125 can include fire protection fluid. For example, the fire protection fluid can be a fire suppressing agent, water, gas, or any combination thereof. The body portion 110 can be made to take fluid from the feed line 125 and disperse the fluid to various portions of the dry pendent sprinkler assembly 105.

The method 900 can include disposing one or more body portions to protrude from an exterior wall 140, as depicted in act 915. For example, the feed line 125 can be disposed on an opposite side of an exterior wall 140 relative to the sprinkler head portion 115. For example, the sprinkler head portion 115 can protrude from an exterior side of the exterior wall 140. For example, the body portion 110 can protrude from the exterior wall 140 at an angle. For example, the body portion 110 can protrude from the exterior wall 140 at an angle greater than 45 degrees relative to an exterior projection 150 that protrudes from the exterior wall 140. For example, the body portion 110 can protrude from the exterior wall 140 at an angle of 55 degrees, of 60 degrees, of 65 degrees, or another angle. The exterior projection 150 can extend laterally from the exterior wall 140 (e.g., awning, canopy, or another projection).

The method 900 can include coupling the one or more dry pendent sprinkler assemblies 105 with the exterior wall 140, as depicted in act 920. For example, a sealing assembly 155 can couple the dry pendent sprinkler assembly 105 with the exterior wall 140. For example, the sealing assembly 155 can couple the dry pendent sprinkler assembly 105 with the exterior wall 140 in various ways (e.g., welding, fasteners, molding, or another way). The sealing assembly 155 can couple the dry pendent sprinkler assembly 105 to the exterior wall 140 such that no air is permitted to move from the outdoor area to the opposite side of the exterior wall 140 through the aperture 165. For example, the sealing assembly 155 can completely seal off the aperture 165 in the exterior wall 140 when coupling the dry pendent sprinkler assembly 105.

The method 900 can include positioning dry pendent assemblies apart from each other along the exterior wall 140, as depicted in act 925. For example, the dry pendent sprinkler assemblies 105 can be positioned along the exterior wall 140 a horizontal distance 305 from one another. The dry pendent sprinkler assemblies 105 can be positioned along the exterior wall 140 at a distance 305 equal to or greater than 6 feet from one another. For example, the dry pendent sprinkler assemblies 105 can be positioned 7 feet apart, 8 feet apart, 9 feet apart, 10 feet apart, or another distance. For example, the dry pendent sprinkler assemblies 105 can be positioned up to 14 feet apart.

The method 900 can include accommodating at least one commodity in accordance with NFPA 13 section 10.3 (2019 edition), as depicted in act 930. For example, the dry pendent sprinkler assembly 105 can cover at least one of the requirements in accordance with NFPA 13 section 10.3 (2019 edition) table 10.3.3.2.1 when positioned at an angle 145 of at least 55 degrees relative to the exterior projection 150. For example, the dry pendent sprinkler assembly 105 can accommodate at least one of the requirements of section 10, such as protecting a maximum room width 205 of 10 feet under an ordinary hazard, noncombustible or limited-combustible ceiling flash, as defined in table 10.3.3.2.1. For example, the dry pendent sprinkler assembly 105 can protect a maximum room width 205 of 14 feet under a light hazard, noncombustible or limited-combustible ceiling flash, as defined in table 10.3.3.2.1. For example, the dry pendent sprinkler assembly 105 can be placed a maximum distance 305 of 14 feet from another dry pendent sprinkler assembly 105 under a light hazard, noncombustible or limited-combustible ceiling finish, as defined in table 10.3.3.2.1. The dry pendent sprinkler assembly 105 can accommodate another requirement of table 10.3.3.2.1 or any combination thereof.

The method 900 can include accommodating at least one commodity in accordance with NFPA 13 section 10 (2019 edition), as depicted in act 935. For example, the dry pendent sprinkler assembly 105 can cover at least one of the requirements in accordance with NFPA 13 section 10 (2019 edition) when positioned at an angle 145 of at least 55 degrees relative to the exterior projection 150.

Figure 10:
FIG. 10 is an example illustration of a process of providing fire protection, according to an example implementation.

FIG. 10 depicts a method 1000 of providing fire protection. The method 1000 can include providing at least one fire protection sprinkler system 100, as depicted in act 1005. For example, the sprinkler system 100 can include at least one dry pendent sprinkler assembly 105. The dry pendent sprinkler assembly 105 can include at least one body portion 110. The dry pendent sprinkler assembly 105 can include at least one sprinkler head portion 115. The dry pendent sprinkler assembly 105 can include at least one deflector portion 120. The sprinkler system 100 can include the body portion 110 secured to the dry pendent sprinkler assembly 105. For example, the body portion 110 can secure the dry pendent sprinkler assembly 105 with at least one feed line 125. The feed line 125 can include fire protection fluid. For example, the fire protection fluid can be fire a suppressing agent, water, gas, or any combination thereof. The sprinkler system 100 can include the body portion 110 protruding from an exterior wall 140. For example, the sprinkler head portion 115 can protrude from an exterior side 135 of the exterior wall 140. For example, the body portion 110 can protrude from the exterior wall 140 at an angle 145. For example, the body portion 110 can protrude from the exterior wall 140 at an angle 145 greater than 45 degrees relative to an exterior projection 150 that protrudes from the exterior wall 140. For example, the body portion 110 can protrude from the exterior wall 140 at an angle 145 of 55 degrees, of 60 degrees, of 65 degrees, or another angle. The exterior projection 150 can extend laterally from the exterior wall 140 (e.g., awning, canopy, or another projection).

The terms "approximately," "about," "substantially", and similar terms are intended to include any given ranges or numbers +/−10%. These terms include insubstantial or inconsequential modifications or alterations of the subject matter described and claimed are considered to be within the scope of the disclosure as recited in the appended claims.

The term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

References to “or” may be construed as inclusive so that any terms described using “or” may indicate any of a single, more than one, and all of the described terms. References to at least one of a conjunctive list of terms may be construed as an inclusive OR to indicate any of a single, more than one, and all of the described terms. For example, a reference to “at least one of ‘A’ and ‘B’” can include only ‘A’, only ‘B’, as well as both ‘A’ and ‘B’. Such references used in conjunction with “comprising” or other open terminology can include additional items.

References herein to the positions of elements (e.g., “top,” “bottom,” “above,” “below”) are merely used to describe the orientation of various elements in the FIGURES. It should be noted that the orientation of various elements may differ according to other exemplary embodiments, and that such variations are intended to be encompassed by the present disclosure.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The construction and arrangement of the fitting assembly as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A fire protection sprinkler system to provide fire protection for an outdoor area, the fire protection sprinkler system comprising:

a dry pendent sprinkler assembly, the dry pendent sprinkler assembly including a body portion, a sprinkler head portion, and a deflector portion;

the body portion securing the dry pendent sprinkler assembly with a feed line, the feed line disposed on an opposite side of an exterior wall relative to the sprinkler head portion, and the feed line including a fire protection fluid;

a sealing assembly that couples the dry pendent sprinkler assembly with the exterior wall, the sealing assembly disposed entirely on the opposite side of the exterior wall and comprising a flanged escutcheon, the flanged escutcheon including:

a minimum angle defined by a smallest angle of the body portion within the exterior wall relative to an opposite side of the flanged escutcheon relative to the sprinkler head portion, the minimum angle defining no more than 35 degrees; and a maximum angle defined a largest angle of the body portion within the exterior wall relative to an opposite side of the flanged escutcheon relative to the sprinkler head portion, the maximum angle defining no less than 145 degrees;

wherein the flanged escutcheon rigidly couples the body portion with the exterior wall;

the body portion protruding from the exterior wall at an angle of at least 55 degrees relative to a structure disposed above the body portion that extends laterally away from the exterior wall and that protrudes into the outdoor area from the exterior wall; and the dry pendent sprinkler assembly configured to expel the fire protection fluid to cover the outdoor area, the outdoor area having a width of at least 10 feet.

2. The fire protection sprinkler system of claim 1, comprising:

the dry pendent sprinkler assembly having a length of throw of at least 12 feet from the exterior wall.

3. The fire protection sprinkler system of claim 1, comprising:

the dry pendent sprinkler assembly body portion devoid of liquid.

4. The fire protection sprinkler system of claim 1, comprising:

the body portion of the dry pendent sprinkler assembly extending through the exterior wall from an opening on the opposite side of the exterior wall to an opening on the exterior wall.

5. The fire protection sprinkler system of claim 1, comprising:

a plurality of dry pendent sprinkler assemblies, the plurality of dry pendent sprinkler assemblies positioned between 6 feet and 14 feet apart from each other along the exterior wall.

6. The fire protection sprinkler system of claim 1, comprising:

the sealing assembly coupling the dry pendent sprinkler assembly with the exterior wall such that no air is permitted to move through the exterior wall.

7. The fire protection sprinkler system of claim 1, comprising:

the escutcheon formed of a metallic material.

8. The fire protection sprinkler system of claim 1, comprising:

the fire protection sprinkler system to accommodate at least one of the commodities in accordance with NFPA 13 section 10.3 (2019) when the dry pendent sprinkler assembly is positioned at a minimum angle of 55 degrees from the lateral exterior projection.

9. The fire protection sprinkler system of claim 1, comprising:

the fire protection sprinkler system to accommodate at least one of the commodities in accordance with NFPA 13 section 10 (2019) when the dry pendent sprinkler assembly is positioned at a minimum angle of 55 degrees from the lateral exterior projection.

10. The fire protection sprinkler system of claim 1, comprising:

the escutcheon couples to the exterior wall through welding.

11. A method of providing fire protection for an outdoor area, comprising:

providing a dry pendent sprinkler assembly, the dry pendent sprinkler assembly including a body portion, a sprinkler head portion, and a deflector portion;

securing, via the body portion, the dry pendent sprinkler assembly with a feed line, the feed line disposed on an opposite side of an exterior wall relative to the sprinkler head portion, and the feed line including a fire protection fluid;

coupling the dry pendent sprinkler assembly with the exterior wall through a sealing assembly, the sealing assembly disposed entirely on the opposite side of the exterior wall and comprising a flanged escutcheon, the flanged escutcheon including:

a minimum angle defined by a smallest angle of the body portion within the exterior wall relative to an opposite side of the flanged escutcheon relative to the sprinkler head portion, the minimum angle defining no more than 35 degrees; and a maximum angle defined a largest angle of the body portion within the exterior wall relative to an opposite side of the flanged escutcheon relative to the sprinkler head portion, the maximum angle defining no less than 145 degrees;

wherein the flanged escutcheon rigidly couples the body portion with the exterior wall;

disposing the body portion to protrude from the exterior wall at an angle of at least 55 degrees relative to a structure disposed above the body portion that extends laterally away from the exterior wall and that protrudes into the outdoor area from the exterior wall; and the dry pendent sprinkler assembly to expel the fire protection fluid to cover the outdoor area, the outdoor area having a width of at least 10 feet.

12. The method of claim 11, comprising:

coupling the dry pendent sprinkler assembly with the exterior wall through the sealing assembly such that no air is permitted to move from the outdoor area through the exterior wall.

13. The method of claim 11, comprising:

positioning a plurality of dry pendent assemblies between 6 feet and 14 feet apart from each other along the exterior wall.

14. The method of claim 11, comprising:

accommodating at least one of the commodities in accordance with NFPA 13 section 10.3 (2019) when the dry pendent sprinkler assembly is positioned at a minimum angle of 55 degrees from the lateral exterior projection.

15. The method of claim 11, comprising:

accommodating at least one of the commodities in accordance with NFPA 13 section 10 (2019) when the dry pendent sprinkler assembly is positioned at a minimum angle of 55 degrees from the lateral exterior projection.

16. A method of providing fire protection for an outdoor area, comprising:

providing a fire protection sprinkler system to provide fire protection for the outdoor area, the fire protection sprinkler system comprising:

a dry pendent sprinkler assembly, the dry pendent sprinkler assembly including a body portion, a sprinkler head portion, and a deflector portion;

the body portion securing the dry pendent sprinkler assembly with a feed line, the feed line disposed on an opposite side of an exterior wall relative to the sprinkler head portion, and the feed line including a fire protection fluid;

a sealing assembly that couples the dry pendent sprinkler assembly with the exterior wall, the sealing assembly disposed entirely on the opposite side of the exterior wall and comprising a flanged escutcheon, the flanged escutcheon including:

a minimum angle defined by a smallest angle of the body portion within the exterior wall relative to an opposite side of the flanged escutcheon relative to the sprinkler head portion, the minimum angle defining no more than 35 degrees; and a maximum angle defined a largest angle of the body portion within the exterior wall relative to an opposite side of the flanged escutcheon relative to the sprinkler head portion, the maximum angle defining no less than 145 degrees;

wherein the flanged escutcheon rigidly couples the body portion with the exterior wall;

the body portion protruding from the exterior wall at an angle of at least 55 degrees relative to a structure disposed above the body portion that extends laterally away from the exterior wall and that protrudes into the outdoor area from the exterior wall; and the dry pendent sprinkler assembly configured to expel the fire protection fluid to cover the outdoor area, the outdoor area having a width of at least 10 feet.

17. The method of claim 16, comprising:

the escutcheon couples to the exterior wall through welding.

* * * * *